(12) United States Patent
Cowelchuk et al.

(10) Patent No.: US 7,344,666 B2
(45) Date of Patent: *Mar. 18, 2008

(54) INTERIOR VEHICLE TRIM PANEL HAVING A SPRAYED EXPANDED POLYURETHANE LAYER AND METHOD AND SYSTEM OF MAKING SAME

(75) Inventors: Glenn A. Cowelchuk, Chesterfield, MI (US); Robert J. Adams, Ypsilanti, MI (US); Kenneth W. Shaner, Howell, MI (US); Randy S. Reed, Fair Haven, MI (US); Nelson E. Williams, Jr., Saline, MI (US); Joseph T. Donatti, Howell, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 209 days.

This patent is subject to a terminal disclaimer.

(21) Appl. No.: 10/911,922

(22) Filed: Aug. 5, 2004

(65) Prior Publication Data

US 2006/0008622 A1  Jan. 12, 2006

Related U.S. Application Data

(63) Continuation-in-part of application No. 10/885,154, filed on Jul. 6, 2004, now Pat. No. 7,147,808.

(51) Int. Cl.
*B29C 41/08* (2006.01)
*B29C 44/06* (2006.01)

(52) U.S. Cl. .................. 264/46.4; 264/255; 264/309
(58) Field of Classification Search .............. 264/46.4, 264/46.5, 46.6, 255, 309
See application file for complete search history.

(56) References Cited

U.S. PATENT DOCUMENTS

| | | | |
|---|---|---|---|
| 3,922,429 A | | 11/1975 | Welch et al. |
| 4,136,226 A | | 1/1979 | Gilman |
| 4,387,491 A | * | 6/1983 | Schaaf et al. .................. 27/35 |
| 5,028,006 A | * | 7/1991 | De Winter et al. ......... 239/399 |
| 5,037,591 A | * | 8/1991 | Rohrlach et al. .......... 264/46.5 |
| 5,073,318 A | * | 12/1991 | Rohrlach et al. .......... 264/46.5 |
| 5,082,609 A | | 1/1992 | Rohrlach et al. |
| 5,288,549 A | | 2/1994 | Zeitler et al. |

(Continued)

FOREIGN PATENT DOCUMENTS

DE  100 07 884 A1  9/2001

(Continued)

*Primary Examiner*—Allan R. Kuhns
(74) *Attorney, Agent, or Firm*—Brooks Kushman P.C.

(57) ABSTRACT

Aspects of the present invention include interior vehicle trim panel having a sprayed expanded polyurethane layer and method of making same. In at least one embodiment, the method of making the vehicle interior trim panel comprises providing a skin layer on a spray tool, spraying expandable polyurethane reactive components onto the skin layer to form a resilient layer, and securing a rigid substrate on the resilient layer, such that the resilient layer extends between and connects the skin layer with the substrate to form the vehicle interior trim panel.

10 Claims, 3 Drawing Sheets

U.S. PATENT DOCUMENTS

| | | |
|---|---|---|
| 5,298,306 A | 3/1994 | Miller |
| 5,389,317 A | 2/1995 | Grimmer |
| 5,418,032 A | 5/1995 | Martin |
| 5,466,412 A | 11/1995 | Parker et al. |
| 5,512,233 A | 4/1996 | Gallagher et al. |
| 5,512,361 A | 4/1996 | Takeuchi et al. |
| 5,582,789 A | 12/1996 | Stein et al. |
| 5,620,636 A | 4/1997 | Kawai et al. |
| 5,626,814 A | 5/1997 | Vicino |
| 5,662,996 A * | 9/1997 | Jourquin et al. ......... 428/318.8 |
| 5,744,231 A | 4/1998 | Igarashi et al. |
| 5,824,407 A | 10/1998 | Hayashi et al. |
| 5,885,662 A | 3/1999 | Gardner, Jr. |
| 5,938,993 A | 8/1999 | Greene |
| 6,013,210 A | 1/2000 | Gardner, Jr. |
| 6,017,617 A | 1/2000 | Gardner, Jr. |
| 6,071,619 A | 6/2000 | De Winter |
| 6,149,853 A | 11/2000 | Luckett et al. |
| 6,213,540 B1 | 4/2001 | Tusim et al. |
| 6,248,200 B1 | 6/2001 | Dailey et al. |
| 6,294,248 B1 | 9/2001 | Madan et al. |
| 6,352,658 B1 | 3/2002 | Chang et al. |
| 6,362,302 B1 | 3/2002 | Boddie |
| 6,391,232 B1 | 5/2002 | Fritsch |
| 6,455,147 B1 | 9/2002 | Mizuno et al. |
| 6,544,449 B1 | 4/2003 | Gardner |
| 7,147,808 B2 * | 12/2006 | Cowelchuk et al. ....... 264/46.4 |
| 2003/0180498 A1 | 9/2003 | De Winter et al. |

FOREIGN PATENT DOCUMENTS

| | | |
|---|---|---|
| DE | 697 17 501 T2 | 4/2004 |
| DE | 699 05 745 T2 | 2/2005 |
| EP | 0 425 240 A3 | 5/1991 |
| GB | 2 415 934 | 1/2006 |
| WO | WO 99/61216 | 12/1999 |

* cited by examiner

INTERIOR VEHICLE TRIM PANEL HAVING A SPRAYED EXPANDED POLYURETHANE LAYER AND METHOD AND SYSTEM OF MAKING SAME

CROSS-REFERENCE TO RELATED APPLICATION

This application is a continuation-in-part of U.S. application Ser. No. 10/885,154 filed Jul. 6, 2004 now U.S. Pat. No. 7,147,808, which is hereby incorporated by reference.

BACKGROUND OF THE INVENTION

1. Field of the Invention

The invention relates to interior vehicle trim panel having a sprayed expanded polyurethane layer, and to a method and system of making such parts.

2. Background Art

One example of a relatively typical vehicle interior trim panel comprises a relatively rigid substrate having a relatively flexible thin plastic skin disposed over at least an interior facing portion of a surface of the substrate. For some panels where a softer touch is desired, foam has been provided between the substrate and the skin. For these types of panels, a foam in place process is often times used to provide the foam. In this type of process, the skin and the substrate are positioned spaced apart in a mold while foam is molded there between. After the foam is molded, the foam extends between and secures the skin to the substrate.

There are occasions where trim panels having a soft feel are desired but because of design constraints are not easily manufacturable. One example is of a door panel having a soft feel above the belt line to match the appearance and feel of the instrument panel. Another example is of a trim panel, such as a door panel or instrument panel, that has undercuts, sharp radii, or other design configuration that results in relatively small, or somewhat significantly uneven, clearances between the skin and the substrate. In these, and other, types of designs, foam in place may have drawbacks that could prevent such a technique from being a suitable option.

SUMMARY OF THE INVENTION

Under the invention, a method of making a vehicle interior trim panel is provided. The method includes the steps of providing a skin layer on a surface of a spray tool, spraying expandable polyurethane reactive components onto the skin layer to form a resilient layer, and securing a rigid substrate to the resilient layer.

Further under the invention, a method of making a vehicle interior trim panel includes applying a coating on the tool prior to the step of providing a skin layer, wherein the coating forms an appearance surface of the panel. In at least one embodiment, the step of providing a skin layer comprises spraying material on the coating to form the skin layer. In at least one embodiment, the skin layer comprises aromatic polyurethane.

The present invention also provides a vehicle interior trim component for use with a motor vehicle. In at least one embodiment, the trim component comprises a skin layer, a sprayed expanded polyurethane resilient layer bonded to the skin layer, and a rigid substrate bonded to the resilient layer.

The present invention also provides a method for making a vehicle interior door part for a vehicle interior. In at least one embodiment, the method comprises providing a base substrate having a show surface and a back surface, and securing a vehicle interior panel described above to the base substrate so that the show surface and the skin layer faces towards the vehicle interior.

The present invention also provides a vehicle interior door part for a vehicle interior. In at least one embodiment, the part comprises a base substrate having a show surface and a back surface, and a vehicle interior trim component described above secured to the base substrate so that the show surface and the skin layer face towards the vehicle interior.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

As required, detailed embodiments of the present invention are disclosed herein. However, it is to be understood that disclosed embodiments are merely exemplary of the invention that may be embodied in various alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention. Moreover, except where otherwise expressly indicated, all numerical quantities in this description and in the claims indicating amounts of materials or conditions of reactions and/or use are to be understood as modified by the word "about" in describing the broadest scope of this invention. Practice within the numeral limit stated is generally preferred. Also, unless expressly stated to the contrary, percent, "parts of," and ratio values are by weight and the description of a group or class of materials as suitable or preferred for a given purpose in connection with the invention implies that mixtures of any two or more members of the group or class may be equally suitable or preferred.

Figure 1:
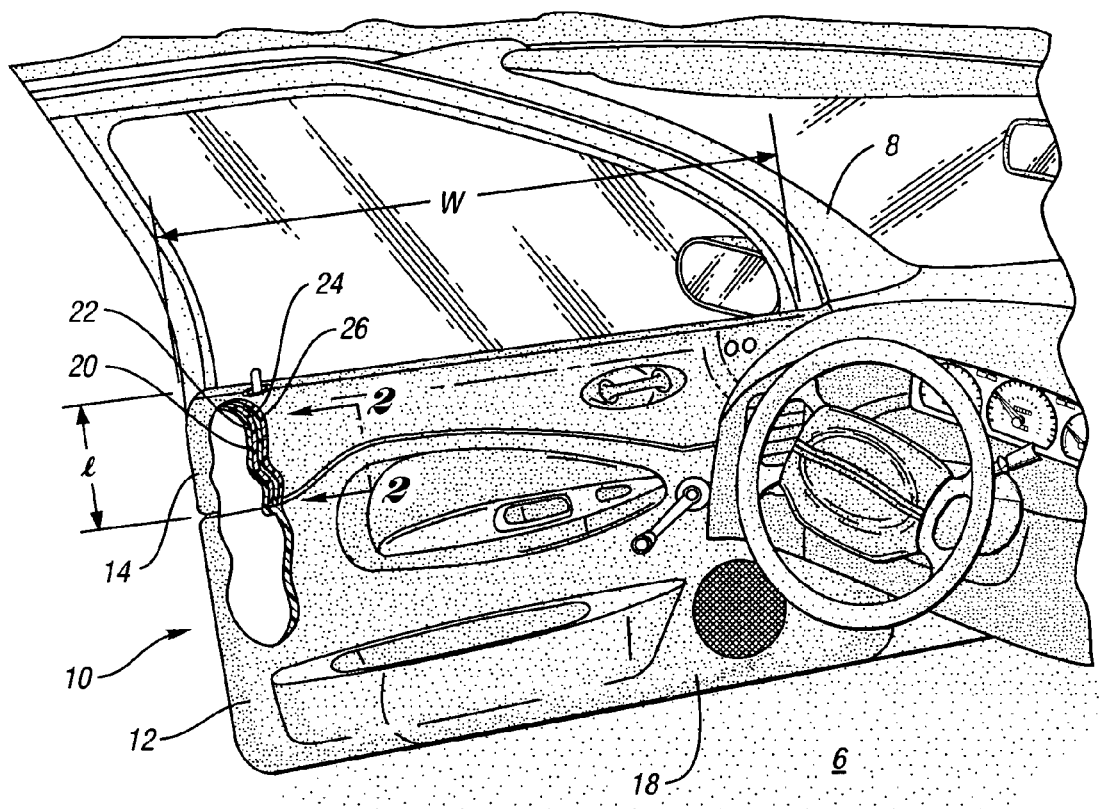
FIG. 1 is a perspective view of vehicle interior including a door panel and an instrument panel in accordance with at least one aspect the invention for use with a motor vehicle.
Figure 2:
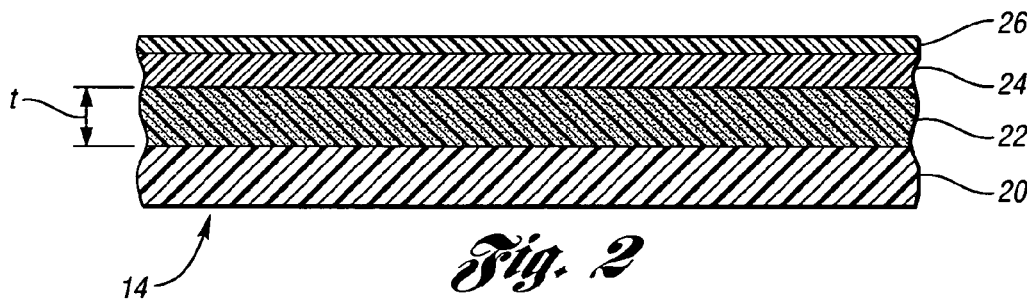
FIG. 2 is a cross-sectional view of the door panel taken along line 2-2 of FIG. 1.

FIG. 1 shows a portion of a vehicle interior 6. FIGS. 1 and 2 show an interior vehicle trim component, such as an door 10, in accordance with at least one aspect of the invention for use with a motor vehicle 8. The door 10 includes a lower door portion 12 and an upper door portion 14. Certain aspects of the present invention will be described below in connection with the door 10, and in particular the upper door portion 14. However, it should be understood that other trim products, such as instrument panels, door covers, console covers, pillar trim panels, shelves, trim covers and the like can also enjoy the benefits of the present invention.

The lower door portion 12 comprises a base substrate 18. The base substrate 18, in at least one embodiment, is uncovered. In certain embodiments, such as one where it is uncovered, the base substrate 18 can be colored and/or textured to provide an aesthetic appearance.

Figure 3:
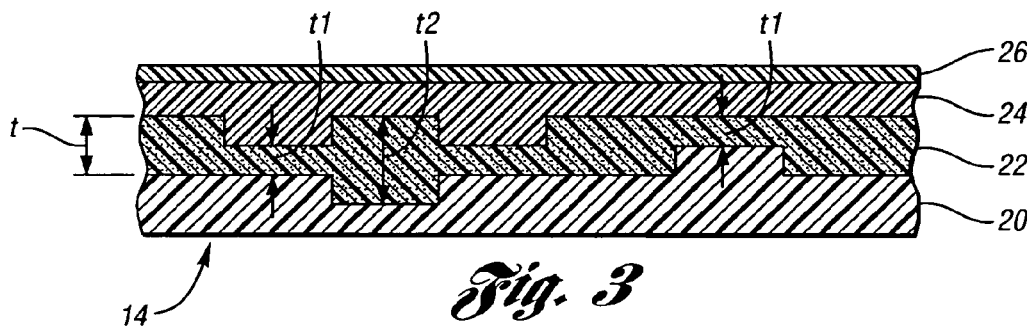
FIG. 3 is similar to FIG. 2 showing another aspect of the present invention.

As shown in FIGS. 1-3, in at least one embodiment, the upper door portion 14 includes a rigid substrate 20, a resilient expanded polyurethane layer 22 attached to the substrate 20, a skin layer 24 attached to the resilient layer 22, and a coating 26 that covers the skin layer 24 and provides an exterior appearance surface.

In at least one embodiment, the upper door portion 14 has a width w of 60 to 125 cm, a length l of 3.75 to 22 cm, and at least a substantial portion having an average thickness t of 0.1 to 8.0 mm. In another embodiment, the average thickness t of the resilient layer is 0.5 to 5.0 mm, and in yet another embodiment 1.5 to 4.0 mm. In at least this embodiment, the relative length l, width w, and clearance t between skin layer 24 and substrate 20 (or thickness t of the layer 22) can make it difficult to employ a foam in place process.

The substrate 20 is a structural member that provides support for the remainder of the upper door portion 14, and may comprise any suitable material. For example, the substrate 20, as well as base substrate 18, may be made of plastic or reinforced plastic, such as fiberglass reinforced polyurethane (GRU). Additional examples of suitable plastics, besides polyurethane, include polypropylene, polyethylene, acrylonitrile butadiene styrene (ABS), polycarbonate (PC), and ABS/PC blends. In at least one embodiment, the substrates 18 and 20 may have independent, or the same, average thicknesses between 0.5 to 5 mm, in another embodiment 1.0 to 3.5 mm, and in yet another embodiment 2.0 to 3.0 mm.

The resilient layer 22 is adhered to the substrate 20 and the skin layer 24 and may be configured to help provide a soft feel to the upper door portion 14. The resilient layer 22 may comprise any suitable sprayed expanded polyurethane material. For example, the resilient layer 22 may comprise an expanded aromatic polyurethane elastomer. In at least one embodiment, the density of the resilient layer 22 can be in the range of 0.10 to 0.75 grams per cubic centimeter (g/cm$^3$), in another embodiment between 0.15 to 0.5 g/cm$^3$, and in yet another embodiment 0.2 to 0.3 g/cm$^3$. In at least one embodiment, the resilient layer may have a shore A hardness of 30 to 50.

In at least one embodiment, the resilient layer 22 primarily may comprise a low permeable, relatively closed cell material. In at least one embodiment, the resilient layer 22 may comprise 35 to 75 percent closed cell structures, in at least another embodiment 40 to 65 percent closed cell structures, and in yet at least another embodiment 45 to 55 percent closed cell structures, based upon the entire resilient layer 22.

In at least one embodiment, the resilient layer 22 may have varying closed cell density throughout the resilient layer. In at least one embodiment, the top portion (the portion closer to the skin layer 24) and the lower portion (the portion closer to the substrate 20) may independently comprise at least 85 percent closed cell structures, in other embodiments between 90 to 100 percent closed cell structures, and in yet other embodiments between 95 and 100 percent closed cell structures. In at least one embodiment, the top and bottom portions may independently comprise between 2.5 to 25 percent, in other embodiments between 5 to 20 percent, and in yet other embodiments between 10 to 15 percent, of the thickness t of the resilient layer 22. The remaining intermediate layer (the portion between the top and bottom portion) of the resilient layer 22 may comprise between 40 to 95 percent closed cell structures, in at least another embodiment between 50 to 90 percent closed cell structures, and in yet another embodiment between 60 to 85 percent closed cell structures. In at least one embodiment, the average cell structure size can vary between 0.05 mm to 3.0 mm, and in yet other embodiment between 0.5 mm to 1.0 mm.

As shown in FIG. 3, the upper door portion 14 may have varying clearances between substrate 20 and the skin 24. Examples of varying clearances are shown as t1 and t2. Varying clearances t1 can be less than t, and in some embodiments are 0.05 to 4.5 mm. Varying clearances t2 can conversely be greater than t and in some embodiments are 6.1 to 15 mm.

The skin layer 24 is adhered to the resilient layer 22 and coating 26. Moreover, the skin layer 24 is configured to provide a covering over the resilient layer 22 and may comprise any sufficiently dense material. For example, the skin layer 24 may be a solid layer that comprises an aromatic or aliphatic compound. As a more specific example, the skin layer 24 may be made of an elastomer such as polyurethane. Furthermore, the skin layer 24 may have any suitable thickness and density. For example, the skin layer 24 may have a thickness in the range of 0.4 to 2 mm, and a density in the range of 0.85 to 1.2 g/cm$^3$. In one embodiment of the invention, the skin layer 24 has a thickness in the range of 0.5 to 1.2 mm, and a density in the range of 0.95 to 1.1 g/cm$^3$.

The optional coating 26 may be used to protect the skin layer 24 and/or to provide a decorative surface for the upper door portion 14. For example, the coating 26 may be used to inhibit sunlight and/or other ultraviolet light from reaching the skin layer 24. As another example, the coating 26 may be used as a paint to provide a desired color and/or texture to the upper door portion 14. While the coating 26 may comprise any suitable material, in at least one embodiment of the invention, the coating 26 is made of an aliphatic polyurethane composition. Furthermore, the coating 26 may have any suitable thickness, such as a thickness of approximately 0.5 to 1.0 mil.

Alternatively, the coating 26 may be omitted if not required for a particular application. For example, the skin layer 24 may be configured to provide a sufficiently durable and attractive surface such that the coating 26 is not needed.

Figure 4:
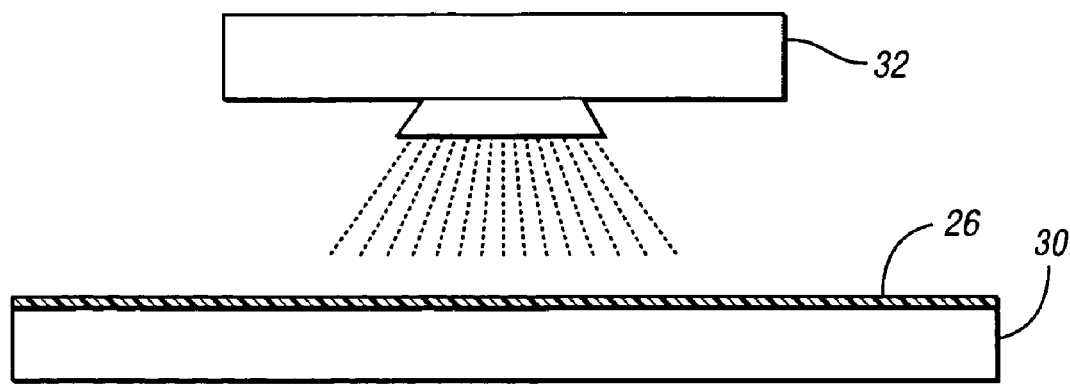
FIG. 4 is a schematic view of a spray tool and spray assembly for use in forming a panel, wherein the spray assembly is shown applying material on the tool to form a coating.
Figure 5:
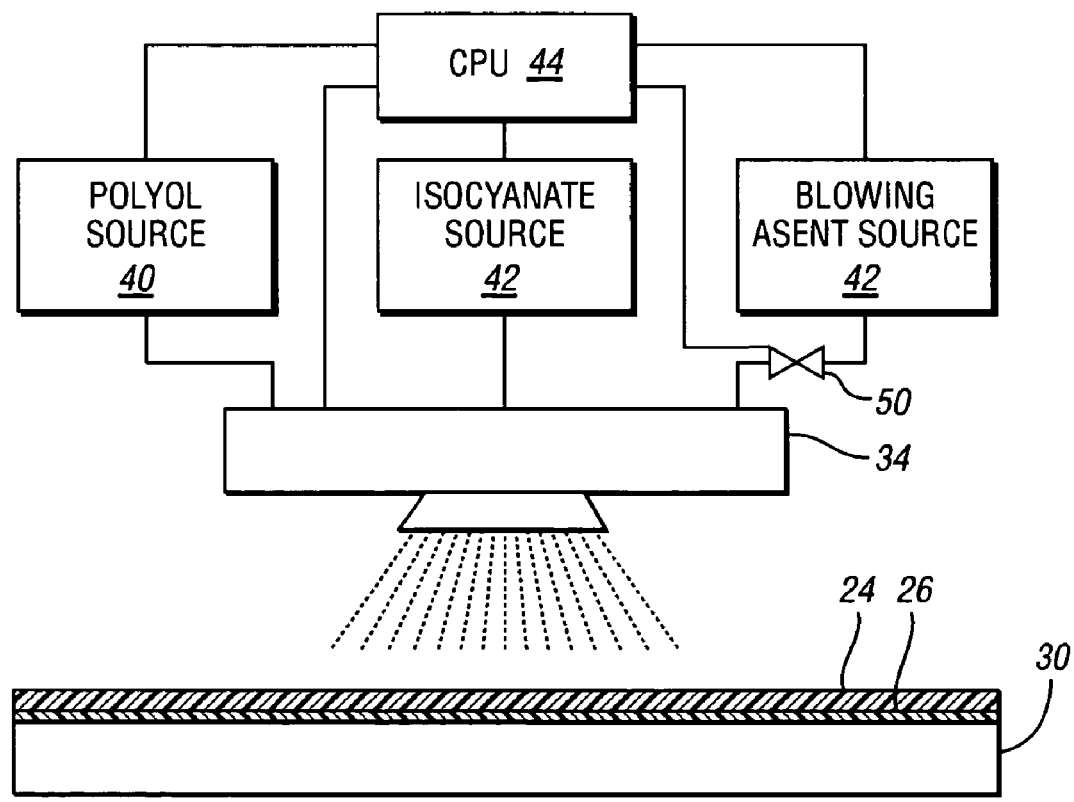
FIG. 5 is a schematic view of the tool showing application of additional material onto the coating to form a skin layer.
Figure 6:
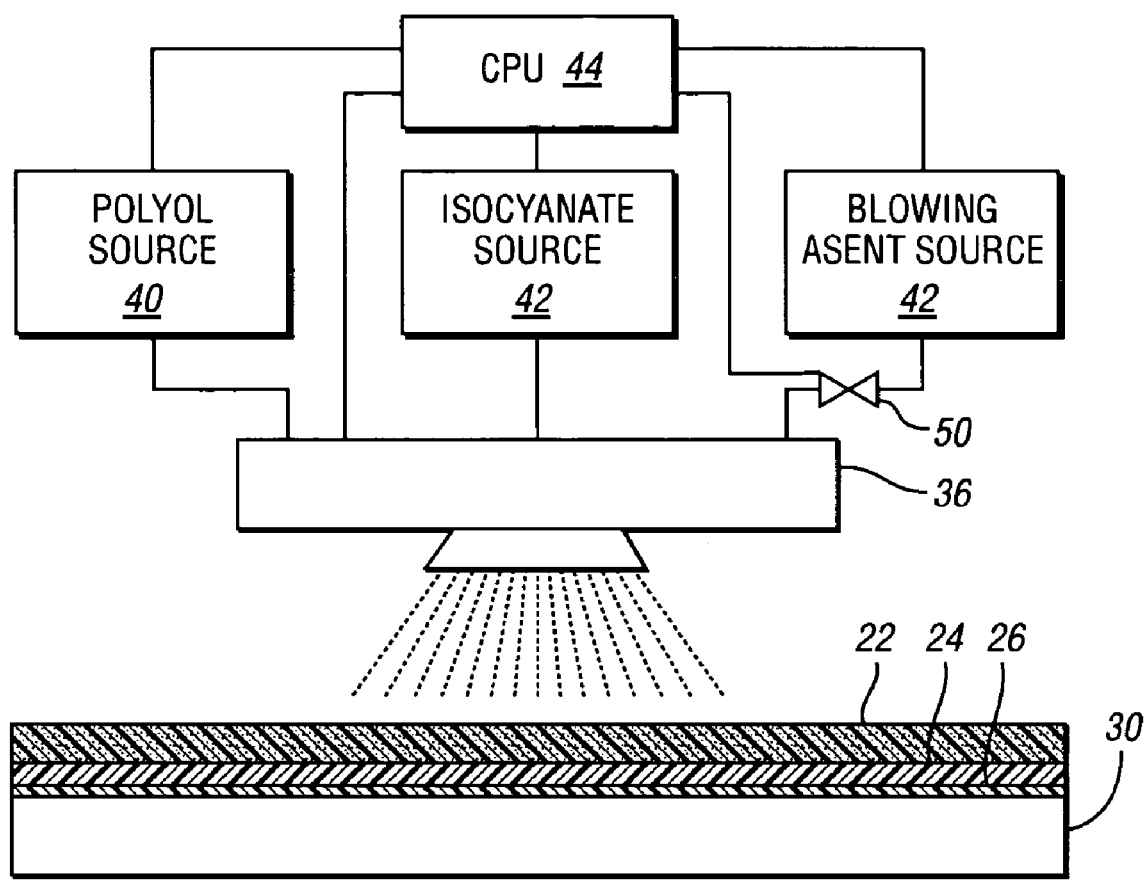
FIG. 6 is a schematic view of the tool showing application of expandable material onto the skin layer to form a resilient layer.

Referring to FIGS. 4-6, a method of manufacturing the upper door portion 14 will now be described. The method may begin by spraying an optional mold release agent and then the optional coating 26 on a spraying mold tool 30 using any suitable device, such as a robotic low pressure (such as 10 to 40 psi) spray assembly 32 having one or more moveable spray nozzles. The tool 30 may be heated to any suitable temperature if desired, generally in the range of 150° C. to 165° C.

Next, referring to FIG. 5, the method involves spraying skin layer forming material onto the coating 26 to form skin layer 24, which bonds to the coating 26. The skin layer forming material may be any suitable sprayable polyurethane forming material (i.e., composition) and may be applied using any suitable device. For example, the material may be sprayed with a high pressure (such as 400 to 2,000 psi) robotic spray assembly 34 having one or more movable spray nozzles. In at least one embodiment, the polyurethane forming material comprises components such as polyol, provided from polyol source 40 and isocyanate, provided from isocyanate source 42. In at least embodiment, the polyurethane forming materials are aromatic and provide an aromatic polyurethane skin layer 24. The polyol and isocyanate, and any other necessary components for forming polyurethane, in at least one embodiment, can be mixed in the spray assembly 34 before being sprayed as the polyurethane forming material onto the coating 26. A CPU 44 can be provided for controlling this operation.

As mentioned above, the coating 26 may be omitted from the upper door portion 14. In such a case, the skin layer forming material may be sprayed directly onto the tool 30, or onto a mold release agent that is applied on the tool 30, to form the skin layer 24. In this embodiment, the polyurethane skin layer 24 is preferably aliphatic.

Referring to FIG. 6, the method then involves spraying expandable polyurethane material onto the skin layer 24 to form resilient layer 22, which bonds to skin layer 24. The expandable polyurethane material may be any suitable sprayable expandable polyurethane material (composition) and may be sprayed in any suitable manner. For example, the expandable polyurethane material may comprise polyol from polyol source 40, isocyanate from isocyanate source 42, and a blowing agent from blowing agent source 48, such as water and/or a readily volatile organic substance, such as a delayed-action amine catalyst. In certain embodiments, specific examples of suitable catalysts are the delayed-action amine catalyst DABCO® BL-17 and the amine catalyst DABCO® BL-22 available from Air Products and Chemicals, Inc. of Allentown, Pa.

Furthermore, the expandable polyurethane material may be sprayed with the same type of robotic spray assembly 36 as used in FIG. 5, and the material may be allowed to free rise to achieve the desired density. Alternatively, the same spray assembly 34 as used in FIG. 5 could be used to spray the expandable polyurethane material. The blowing agent, may be provided as a "neat" (pure) component, or may be provided in a premixed stream containing at least another expandable polyurethane composition component, such as polyol. If the expandable polyurethane material is sprayed from the same spray assembly 34 as the polyurethane forming material in FIG. 5 is, at least one valve 50 can be provided for selectively controlling, by the CPU 44, whether, and what relative amount the blowing agent is sent to the spraying assembly 34. If the blowing agent is to be premixed with one of the expandable polyurethane composition components, either all or some of that component can be premixed with the blowing agent. If all of the component is mixed with the blowing agent, it should be understood that either polyol source 40 or isocyanate source 42 need not be employed during the spraying of the expanded polyurethane composition.

It should be understood that the expandable polyurethane material may be sprayed to achieve any desired thickness t at any location, such that the thickness of the resilient layer 22 may vary as best shown in FIG. 3. Thus, the expandable polyurethane material may be more lightly applied in certain areas such as t1 where there is less clearance between substrate 20 and skin 24, and more heavily applied in areas, such as t2 where there is more clearance between substrate 20 and skin 24.

Next, the method involves securing the substrate 20 to the expanded polyurethane layer 22. In one embodiment, this can be done by removing the coating 26, skin layer 24 and resilient expanded polyurethane layer 22 from the tool 30 and positioning the layers 22, 24 and 26 in a mold having first and second mold portions. The mold portions may then be closed together, with material being injected into the mold through one or more injection passages (not shown) to form substrate 20, which bonds to the resilient layer 22. Alternatively, the material may be poured into the mold, and then the mold portions may be closed together.

While the substrate material may comprise any suitable substance or substances, in one embodiment, the material includes polyol and isocyanate such that the substrate 20 is formed of polyurethane. Other suitable materials include polypropylene, polyethylene, ABS, PC, ABS/PC blends, GRU and RRIM.

Whether the material is injected or poured into the mold, such a process may be referred to as reaction injection molding (RIM). Reinforcing material such as milled glass or glass fibers may also be added during the RIM process to provide reinforcement to the substrate 20. As another example, a reinforcing mat or preform, such as a fiberglass preform, may be positioned in the mold prior to the RIM process. This process may be referred to as structural reaction injection molding (SRIM). RRIM is the process where milled glass is mixed with polyol before reacting the polyol with the isocyanate.

In at least one embodiment, the substrate 20 could be a preformed substrate that is secured to the layer 22 by suitable means, such as adhesively.

After the substrate 20 has been secured to layer 22, the lower door portion 12 and the upper door portion 14 can then be secured to each other by any suitable method, such as by heat staking, snap fitting or fastening.

Examples of other vehicle parts that may be manufactured by the above method include instrument panels, door panels, door covers, package shelves, pillar trim panels, trim covers, and console covers.

Although separate spray assemblies 32 and 34 are shown in the Figures, the spray assemblies 32 and 34 may be provided as a single spray assembly.

Furthermore, if the material to be sprayed includes multiple substances, the substances may be mixed at any suitable time. For example, the substances may be mixed upstream of, within, or downstream of associated spray nozzles.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a vehicle interior trim panel, the method comprising:

applying a coating on a tool;

spraying skin layer forming material on the coating to form a skin layer on the coating;

spraying expandable polyurethane reactive components onto the skin layer to form a resilient layer on the skin layer;

removing the coating, the skin layer and the resilient layer from the tool;

positioning the coating, the skin layer and the resilient layer in a mold; and securing a rigid substrate on the resilient layer, such that the resilient layer extends between and connects the skin layer with the substrate to form the vehicle interior trim part wherein the coating forms an exterior appearance surface of the panel.

2. The method of claim 1 wherein the resilient layer has a density of 0.1 to 0.75 g/cm$^3$.

3. The method of claim 2 wherein a substantial portion of the resilient layer has a thickness of 0.1 to 8.0 mm and a shore A hardness of 30 to 50.

4. The method of claim 3 wherein the resilient layer has a first portion having a first thickness of 0.05 to 4.0 mm and a second portion having a thickness of 6.1 to 15 mm.

5. The method of claim 3 wherein the expandable polyurethane reactive components comprise polyol, isocyanate and a blowing agent.

6. The method of claim 1 wherein the skin layer comprises polyurethane.

7. The method of claim 5 wherein the blowing agent comprises a delayed-action amine catalyst.

8. The method of claim 1 wherein the resilient layer comprises an elastomer.

9. The method of claim 1 wherein the rigid substrate is secured directly to the resilient layer.

10. The method of claim 1 wherein the securing step comprises injecting material into the mold when the mold is in a closed position to form the substrate, wherein the substrate has attachment members for attaching the trim panel to the vehicle.

* * * * *